No. 840,780. PATENTED JAN. 8, 1907.
B. D. LIGON & W. E. JENNINGS.
PLOW.
APPLICATION FILED OCT. 11, 1906.
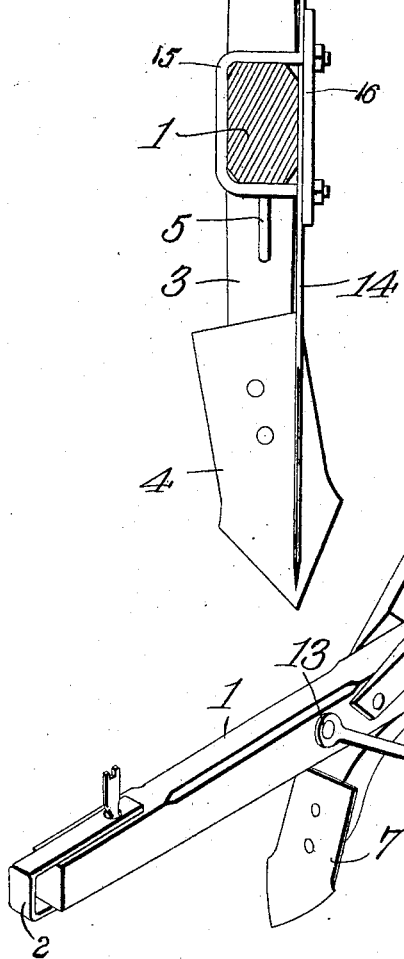
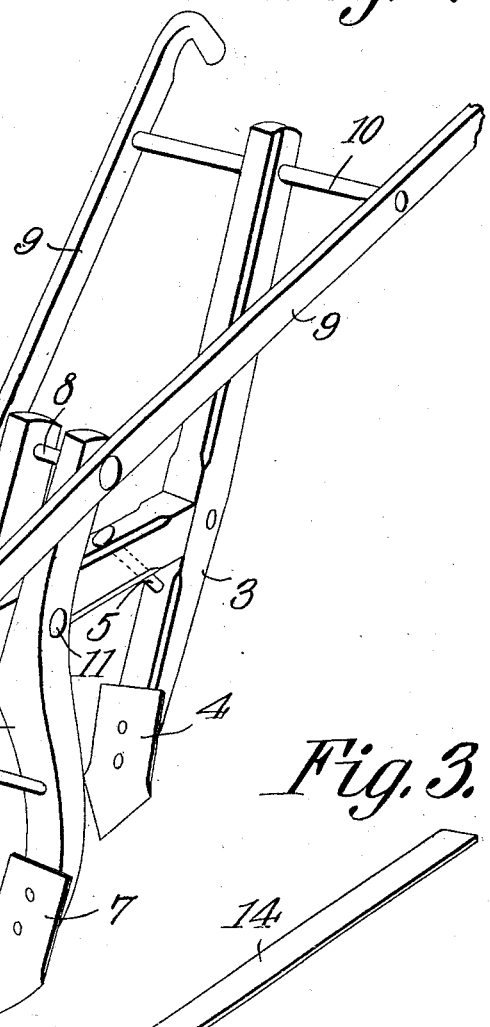
WITNESSES:
E. H. Stewart
C. Bradury
Bedford D. Ligon and
William E. Jennings
INVENTORS
By C. A. Snow & Co.
ATTORNEYS
THE NORRIS PETERS CO., WASHINGTON, D. C.

UNITED STATES PATENT OFFICE.

BEDFORD D. LIGON AND WILLIAM E. JENNINGS, OF ROBARD, KENTUCKY.

PLOW.

No. 840,780.  Specification of Letters Patent.  Patented Jan. 8, 1907.

Application filed October 11, 1906. Serial No. 338,459.

*To all whom it may concern:*

Be it known that we, BEDFORD D. LIGON and WILLIAM E. JENNINGS, citizens of the United States, residing at Robard, in the county of Henderson and State of Kentucky, have invented a new and useful Plow, of which the following is a specification.

This invention has relation to plows; and it consists in the novel construction and arrangement of its parts, as hereinafter shown and described.

The object of the invention is to provide a plow adapted especially to be used in laying off rows or for working crops, such as cotton, corn, or tobacco, and the like. The plow comprises a beam to the rear end of which is permanently fixed a standard. At an intermediate point the said beam is provided with standards, which may be easily and readily detached therefrom. Each of the said standards carries a plow-point, and the tip of the point carried by the rear standard is in vertical alinement with one side of the beam. A colter may be attached to the side of the beam in vertical alinement with the tip of the rear plow-point. When the said colter is used, the forward standards are removed and the plow is used for laying off rows. When it is desired to use the implement for working between the rows of a growing crop, the colter is removed and the forward standards are applied to the beam.

In the accompanying drawings, Figure 1 is a perspective view of the plow. Fig. 2 is a transverse sectional view of the lower portion of the same, showing the colter attached; and Fig. 3 is a perspective view of the colter.

The plow comprises a beam 1, to the forward end of which is attached a clevis 2 and to the rear end of which is permanently attached the standard 3. The plow-point 4 is attached to the lower end of the standard 3. The brace 5 passes through the beam 1 at its upper end and through the standard 3 at its lower end. The tip of the plow-point 4 is in vertical alinement with the side of the beam 1.

Removable standards 6 6 are provided, and each said standard is provided at its lower end with a plow-point 7. The upper ends of the standards 6 6 project above the beam 1 and are attached, by means of the round 8, to the handles 9. The upper end of the beam 3 is also attached to the handles 9 by means of the round 10. The standard 3 is located directly in the rear of the beam 1, while the standards 6 6 are located one on each side of the said beam, and both of the standards are attached to the beam by means of the bolt 11. Each standard 6 is provided with a brace 12, and the said braces are attached to opposite sides of the beam 1 by means of the bolt 13. It will thus be seen that by removing the bolts 11 13 and the round 8 the standards 6 6 are removed from the implement without disturbing the arrangement of the remaining parts thereof. When the standards 6 6 are applied to the implement, the plow is adapted to be used for working between the rows of growing crops. When the said standards 6 are removed, the colter 14 may be attached to the side of the beam 1, and when so attached the said colter will be in vertical alinement with the tip of the plow-point 4. When the parts are arranged as last above stated, the implement is adaptable for use in laying off the ground.

The U-shaped clamp 15 and the plate 16 are used for the purpose of attaching the colter 14 to the beam 1. Said clamp and plate receive the beam and colter in the manner as illustrated in Fig. 2.

It will be observed that a substantial structure is provided and the parts are so arranged as to brace and support one another.

Having described our invention, what we claim as new, and desire to secure by Letters Patent, is—

A plow comprising a beam, a standard attached to the end thereof, removable standards attached to opposite sides of the beam, a bolt passing through the side standards and the beam, braces attached to the side standards, a bolt fixing the upper ends of said braces to the beam, handles attached at their lower ends to the beam, a round connecting the upper end of the end standard with the handles, said handles being connected with the upper ends of the side standards, and a plow-point attached to the end standard and having its tip in vertical alinement with the side of the beam.

In testimony that we claim the foregoing as our own we have hereto affixed our signatures in the presence of two witnesses.

BEDFORD D. LIGON.
WILLIAM E. JENNINGS.

Witnesses:
T. M. ROBARDE,
F. M. CANFIELD.